United States Patent [19]
Dorflinger

[11] 3,731,724
[45] May 8, 1973

[54] SELF-LOCKING THREADED INSERT
[75] Inventor: Max F. Dorflinger, Huntington Beach, Calif.
[73] Assignee: USM Corporation, Boston, Mass.
[22] Filed: July 30, 1971
[21] Appl. No.: 167,689

[52] U.S. Cl.............151/7, 10/10 A, 117/105.3, 156/293
[51] Int. Cl..............................F16b 39/34
[58] Field of Search ..........151/7; 156/293; 117/105.3; 264/267, 262; 10/10 P, 86 A, 10 R; 85/1 C, 10.1

[56] References Cited

UNITED STATES PATENTS

| | | | |
|---|---|---|---|
| 2,544,096 | 3/1951 | Laughlin | 151/7 UX |
| 3,173,466 | 3/1965 | Starriett et al. | 151/7 |
| 3,294,139 | 12/1966 | Preziosi | 151/7 |
| 3,308,865 | 3/1967 | Raichelson et al. | 151/7 |
| 3,389,010 | 6/1968 | Burch | 151/7 UX |
| 3,416,492 | 12/1968 | Greenleaf | 151/7 UX |
| 3,498,352 | 3/1970 | Duffy | 151/7 |
| 3,625,875 | 12/1971 | Frauenglass | 151/7 X |

FOREIGN PATENTS OR APPLICATIONS 1,178,497   1/1970   Great Britain.....................151/7

*Primary Examiner*—Ramon S. Britts
*Attorney*—Richard B. Megley et al.

[57] ABSTRACT

A self-locking threaded sleeve insert having an external screw thread and an internal screw thread, an aperture through a wall of the sleeve intermediate its ends, a body of normally hard tough resilient resin strongly adherent to the external thread surface in surface portions adjacent to the aperture and a body of normally hard tough resilient resin strongly adherent to the surface of the internal thread. The two bodies of resin may be formed by heating the sleeve and directing a stream of resin particles against the heated surface of the sleeve to deposit resin on the external thread surface adjacent the aperture and to pass through the aperture and deposit resin on the internal thread surface.

8 Claims, 9 Drawing Figures

Patented May 8, 1973 3,731,724

Inventor
Max F. Dorflinger
By his Attorney
Benjamin C. Pollard

Patented May 8, 1973 3,731,724

SELF-LOCKING THREADED INSERT

BACKGROUND OF THE INVENTION

This invention relates to a self-locking threaded sleeve insert including deposits of deformable resin on internal and external threaded portions.

DESCRIPTION OF THE PRIOR ART

Self-locking threaded inserts have been proposed in which a body of deformable plastic is mounted in force-fit relation in an aperture in the wall of the sleeve. This self-locking insert depended for ultimate locking action on the compression of the plastic body between the surface of the bore of the body in which the insert is screwed and the threaded surface of the fastener screwed into the insert. Because of the nature of the locking action, there was no effective control of the relative locking torque between the threaded fastener and the insert on the one hand and between the insert and the threaded bore of the body on the other hand. Because of this lack of control there existed the chance of the insert coming out of the bore of the body when an effort was made to remove the threaded fastener. Also, until the threaded fastener had been screwed in to an extent sufficient to press the plastic body against the threaded bore of the body, maximum locking torque holding the insert in place in the threaded bore was not obtained.

SUMMARY OF THE INVENTION

It is an object of the present invention to provide a self-locking threaded sleeve insert having an external screw thread and an internal screw thread and adhered bodies of deformable resin independently effective to provide locking action between the threaded insert and the threaded bore of the body and between the threaded insert and a threaded fastener.

To this end and in accordance with a feature of the present invention, I have provided a threaded sleeve insert having an aperture through a wall intermediate the ends of the insert, a body of deformable resin adjacent the aperture on the external threaded surface and a second deposit of deformable resin on the surface of the internal thread. In a preferred form, the size and effective locking action of these bodies of resin is controlled to provide a greater locking torque between the insert and the threaded bore of the body than between the insert and the threaded fastener.

It is a further object of the present invention to provide a simple and inexpensive self-locking threaded insert without the special precautions for accurate control of size of a plastic locking body and without the assembly procedure required for insuring a force-fit to hold such plastic locking body in place.

To this end and in accordance with a further feature of the invention an internally and externally threaded sleeve insert having an aperture through a wall intermediate the ends of the insert is heated and locking bodies are formed on the internal and external threaded surfaces simultaneously by directing a stream of resin particles in a manner that a portion passes through the aperture and collects on the internal thread surface and a further portion collects on the external thread surface portions adjacent the aperture.

BRIEF DESCRIPTION OF THE DRAWING

The invention will be described further in connection with the attached drawings in which.

BRIEF DESCRIPTION OF THE EMBODIMENTS

Figure 1:
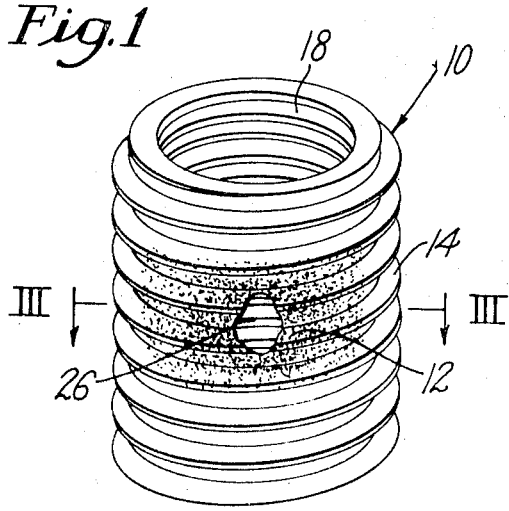
FIG. 1 is a perspective view of one form of self-locking threaded sleeve insert according to the present invention.

A self-locking threaded sleeve insert 10 (see FIGS. 1-6) according to the present invention carries a deposit 12 on the external screw threaded surface 14 and a second deposit 16 on the internal screw threaded surface 18, these deposits being plastic bodies of tough resilient resin formed in situ on selected areas of the threaded surface of the insert by deposition and fusion of fine particles of resin on heated surfaces of the insert. A film of primer or tying material (not shown) may be provided on the selected areas between the threaded surfaces 14 and 18 of the insert 10 and the deposits 12 and 16, this film serving to aid in deposition of the plastic particles in the course of forming the deposits and to give superior adhesion between the surfaces and the deposits.

The deposit 12 on the external threaded surface 14 covers the valley 20, the inclined helical bearing surfaces 22 and the crests 24 of the threaded surface in areas surrounding an aperture 26 extending through the wall of the insert 10. This deposit 12 is so located as to be compressed between the threaded surface 14 of the insert 10 and mating threads in a hole in a body into which the insert has been screwed to provide increased frictional resistance to undersired loosening of the threaded engagement between the insert and the body.

Figure 2:
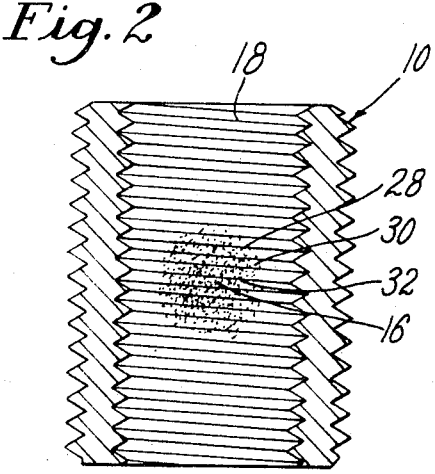
FIG. 2 is a longitudinal view of the threaded insert shown in FIG. 1 and illustrative of the resin locking body on the interior threads.
Figure 3:
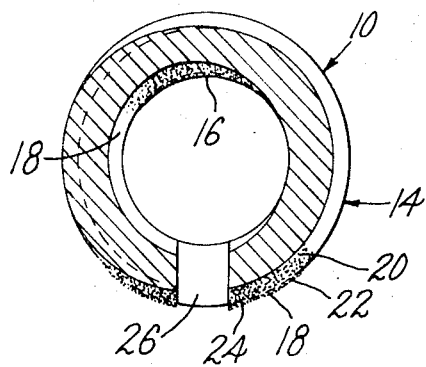
FIG. 3 is a section taken substantially along line III—III of FIG. 1 showing the relation of the body of resin on the external threads and the body of resin on the internal threads to the aperture through the wall of the insert.
Figure 4:
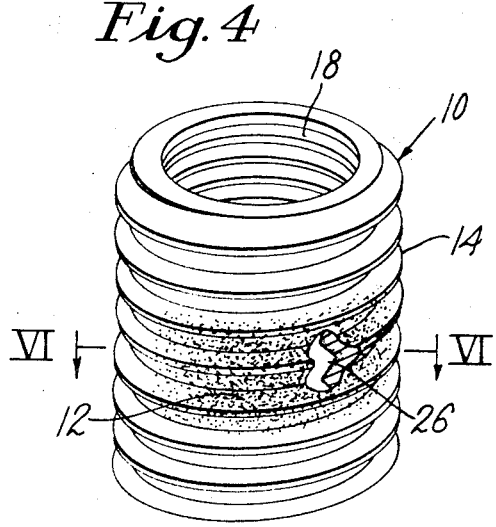
FIG. 4 is a perspective view of another form of self-locking threaded sleeve insert according to the present invention.
Figure 5:
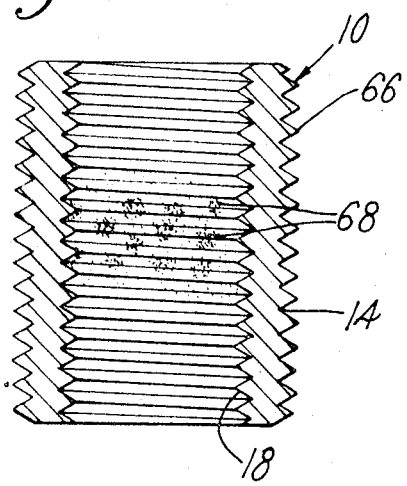
FIG. 5 is a longitudinal view of the insert shown in FIG. 4 and illustrative of the pattern of resin body on the internal threads.
Figure 6:
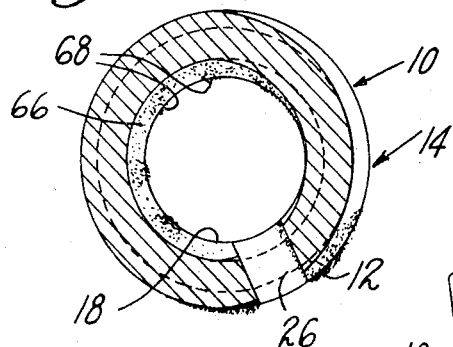
FIG. 6 is a section taken substantially along line VI—VI of FIG. 4 showing the relation of the body of resin on the external threads and the body of resin on the internal threads to the aperture in the wall of the insert.
Figure 8:
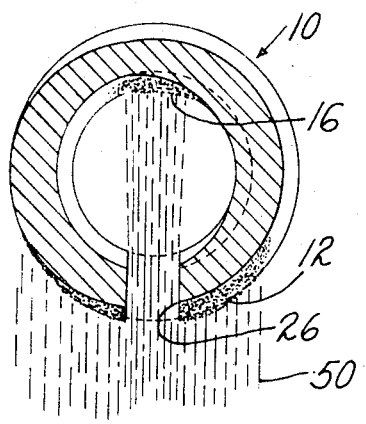
FIG. 8 is a section taken along a line comparable to that of FIG. 3 showing the movement of resin particles in forming locking bodies on internal screw threads to form a self-locking insert of the type shown in FIGS. 1 to 3.
Figure 9:
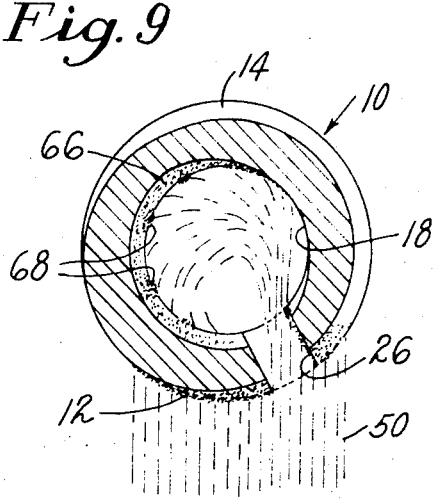
FIG. 9 is a section taken along a line comparable to that of FIG. 3 showing the movement of resin particles in forming locking bodies of internal screw threads to form a self-locking insert of the type shown in FIGS. 4 to 6.

The second deposit 16 covers the valleys 28, the inclined helical bearing surfaces 30, and the crests 32 of portions of the internal threaded surface 18 and is so located as to be compressed between the internal threaded surface 18 of the insert 10 and mating threads of a complementary element which is screwed into the insert 10 to provide increased frictional resistance against undesired loosening of the threaded engagement between the insert and the threaded element. The deposit 16 of resin on the internal threaded surface 18 may be localized on areas of the threaded surface diametrically opposite the aperture as shown in FIGS. 2, 3, and 8 or may be distributed in a number of randomly arranged smaller bodies extending substantially around the inner threaded surface as shown in FIGS. 5, 6, and 9.

The process of forming the resin deposits is similar in many aspects to the process of forming a locking deposit described in the patent of Duffy, U.S. Pat. No. 3,498,352, entitled "Self-Locking Threaded Element" issued Mar. 3, 1970. As in the process shown in the patent, the threaded insert 10 on which the deposits are to be formed is mounted on a carrier 34, is heated, and is sprayed with finely divided resin particles which collect on the heated surface to form the plastic bodies.

Figure 7:
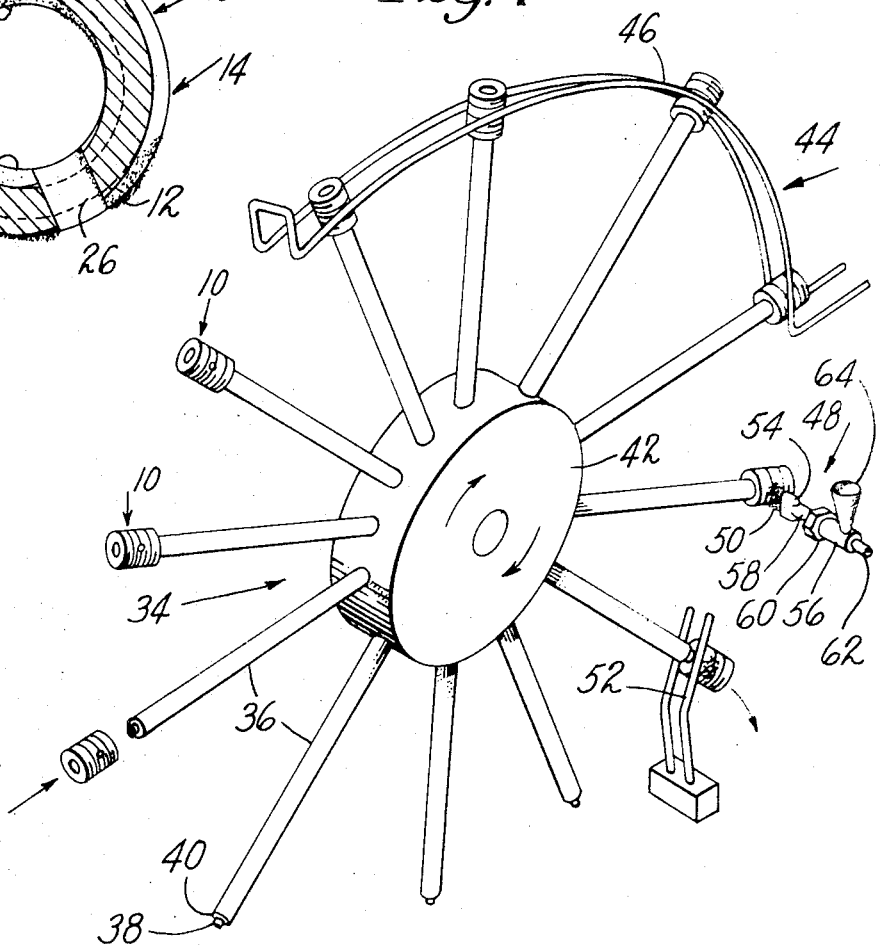
FIG. 7 is a diagrammatic angular view of one form of apparatus useful for practicing the method of the present invention.

For treating the threaded insert, however, the carrier 34 provides pins 36 on which the inserts 10 are mounted as shown, for example, in FIG. 7, the pins 36 including portions 38 having a reduced diameter very slightly less than the interior diameter of the inserts 10 and shoulder portions 40 to limit the extent to which the reduced diameter portions 38 of the pins can enter the inserts when the inserts are placed on the pins. The carrier pins 36 may be mounted for movement in a circular path, e.g., on a hub member 42 or alternately the pins may be mounted on an endless belt or other conveyor (not shown) for movement to successive treating stations.

The inserts 10 may be given a primer coat either before or after mounting on the pins 36 and if such coating is applied, the primer is dried before the inserts are carried to a heating station. The heating station may be an oven but preferably is a high frequency field heating unit 44 designed to heat inserts 10 moving past it. As shown in the drawing, the coil 46 of the heating unit 44 is elongated in the direction of movement of the inserts 10 to provide a controlled heating time for the moving inserts 10 to raise them to the desired temperature.

From the heating station, the inserts 10 are next moved to a station 48 at which fine resin particles are applied. At this station, a stream 50 of fine resin particles, preferably entrained in air or other gas, is directed at the heated inserts 10. The velocity of the particles in the stream should be kept in the range from about 5 to about 50 feet per second, preferably within from about 10 to about 20 feet per second for deposition on the inserts.

It is generally preferred that the inserts 10 be disposed on the carrier pins 36 in a fashion such that the axis of the aperture 26 will be in line with the axis of the stream 50 of particles as the insert 10 is moved relative to the stream of particles. Particles are caught and held on the hot surface 14 of the external threads in portions surrounding the aperture 26 and other particles pass through the aperture 26 and are caught and held on the hot surface 18 of the internal thread in portions opposite the aperture 26. The particles caught on the hot surfaces are then fused to continuous coherent bodies 12 and 16. Ordinarily, the sensible heat of the inserts 10 is adequate to effect fusion; but further heat may be supplied if needed. When the insert 10 and bodies 12 and 16 of resin material have cooled, the resin is in the form of coherent tough resilient patches covering the crests 20 and 28, sides 22 and 30, and valleys 24 and 32 of the selected areas of the external and internal threaded surfaces 14 and 18. After the inserts 10 have been moved past the streams 50 of particles for collecting and fusing particles to form resin bodies 12 and 16, they are carried past resilient fingers 52 which strip the inserts from the pins 36.

Where a primer or tying coat is applied to the threaded surface, prior to heat and application of the plastic, the primer, or tying agent will be softened by the heating step so that it will aid in trapping the resin particles in the stream directed against it and also will improve the union between the applied resin particles and the threaded surfaces. A wide variety of heat-softenable resin primers or tying agents may be used such, for example, as polyamide resins, epoxy resins, resorcinol aldehyde resins, and combinations of these. The primer or tying agent may be applied to the threaded surface in a volatile solvent solution. For example, a 10 percent solvent solution of an alcohol soluble nylon in denatured alcohol gives good results.

The locking bodies or patches are formed of tough resilient heat softenable resin materials. Polyamide and polyester resins have been found particularly useful and the preferred polyamide resins include nylon 11 and nylon 66. The resin materials are applied in the form of fine particles. The size of the particles to be used depends to some extent on the size of the threaded element to which the patch is to be applied. The smaller the threaded element the smaller the particles desired. For a ⅜ inch threaded insert, a useful range of particle sizes is such that only about 2 percent would be retained on a No. 140 sieve.

It has also been found that an effective primer for combination with the resin of the locking deposit may be obtained using a powder mixture formed by combining a minor proportion, i.e., from about 5 percent to about 35 percent by weight of particles of a primer or tying agent such as those above noted, with a major portion, i.e., from about 95 percent to about 65 percent by weight of particles of the resin material which makes up the main body of the locking deposit, both percentages being on the weight of the powder mixture. It appears that the primer or tying material fuses at a lower temperature than does the primer resin material and also that it is more fluid and more capable of wetting the threaded surface so that the heat of the insert causes it to fuse and flow into wetting engagement with the threaded surface of the insert to provide the desired primer and tying action.

In forming locking deposits on the threaded surfaces of the inserts, the temperature selected will be governed by the softening or melting temperatures of the primer or tying material and of the primary resin material. Where the powdered resin is the polyamide, nylon 11, which has a melting point of 367°F, temperatures in the range of 450° to 650°F have been found satisfactory. It is desirable that the temperature to which the inserts are heated be such that the sensible heat is sufficient to keep the temperature of the inserts above about 200°F for at least about 20 seconds.

Heating of the threaded element, for example, an insert 10, is preferably effected by a high frequency electric field, but the element may be heated in an oven or by other heating means. It has been found that at a frequency of 450 kilocycles, a steel threaded insert can be brought to the desired temperature in from 2 to 3 seconds. In a continuous process, the inserts may be passed through the high frequency field at a rate providing the desired heating time.

FIG. 8 illustrates the path of resin particles to form locking deposits 12 and 16 on the threaded insert 10 where the axis of the aperture 26 is in alignment with the stream of particles issuing from the jet nozzle 54 of the applicator 56. As shown the jet nozzle 54 is formed as the flattened end of a tubular member 58 which is secured to one end of a manifold 60 into which gas under pressure is supplied through an inlet 62 and resin particles are dropped into the gas from a conical hopper 64. The flattened nozzle 54 is oriented so that the long dimension of the flattened portion is essentially parallel to the direction of movement of the insert and provides a relatively wide substantially parallel flow stream 50 of particles through which the insert 10 is moved. The long dimension of the nozzle controls the time during which an insert 10 moving at a fixed rate on the carrier 32 is exposed to the spray of particles and therefore controls the amount of resin deposited on the threaded surfaces. The shorter dimension of the nozzle determines the axial length of the body of resin deposited on the insert. The short dimension of the nozzle will ordinarily be somewhat greater than the diameter of the aperture 26 in order that the resin deposited on the external thread may include portions of the threaded surface above and below the aperture 26 as well as portions at the sides of the aperture.

It is ordinarily desirable that the locking torque between the external thread surface 14 of the insert 10 and the threaded surface of the body in which it is inserted be greater than the torque between the internal threaded surface 18 of the insert 10 land a threaded fastener screwed into the insert. Locking torque depends in considerable measure on the area of the locking deposits on the external and internal threads and this is dependent at least in part on the ratio between the diameter of the aperture and the shorter dimension of the nozzle which determines the axial length of resin body deposited on the insert. It has been found desirable that the ratio of the area of the resin deposit 12 on the external thread surface 14 be to the area of the resin deposit 16 on the internal thread be in the range of from 1:1::4:1. Also, it is desirable that the diameter of the aperture 26 be no greater than about three-fourths of the internal diameter of the insert 10.

FIG. 9 shows deposition of resin with the axis of the aperture 26 at an angle to the direction of the stream 50 of resin particles for forming any internal locking deposit 66 of the type shown in FIGS. 5 and 6. As shown by the arrows in FIG. 9, the stream 50 of particles entering in the aperture 26 is deflected from the slanting opposite interior threaded surface 18 of the insert 10 so that the particles travel in a circular path within the insert 10 and deposit resin in small bodies 68 adhering to the internal threaded surface 18 around a major portion of the interior of the insert. While this deposition around the interior does not provide so great a locking action as does the deposit formed where the axis of the aperture 26 is in alignment with the stream of resin particles, it may be of advantage where somewhat lower torque is desired.

The following example is give as a possible aid in understanding the invention, but it is to be understood that the invention is not limited to the materials, conditions, or procedures of the example.

EXAMPLE

Threaded sleeve inserts with apertures in their side walls were mounted on pins of a carrier device as shown in FIG. 7 with the axis of the aperture at right angles to the direction of movement of the carrier pins. The inserts treated had an interior diameter of 0.164 inch. with 32 threads per inch. and an exterior diameter of 0.216 inch. with 28 threads per inch an aperture diameter of 0.076 inch, and were made of steel with a black oxide finish. The inserts were carried on pins in proximity to the high frequency coil which was operating at a frequency of about 450 kc. with a power source of 2 kw. capacity. In passing through the field the temperatures of the inserts reached about 600°F. Thereafter, the inserts were carried through a laterally directed stream of resin particles, the stream being substantially in line with the axes of the aperture of the inserts. The resin particles were a mixture of a major portion of powdered polyamide resin (nylon 11) and a minor preparation of epoxy resin and had a particle size distribution such that less than about 2 per cent were retained on a number 70 sieve, about 90 per cent were retained on a number 140 sieve and about 5 per cent passed a number 325 sieve. The heated surface of the insert caught and held powder particles. It is believed that the epoxy resin softened first to wet and, in effect, prime the surface of the inserts to aid in holding the particles of polyamide resin. The particles caught on the heated surface were fused by heat to form firmly adhered plastic patches. Since the axes of the apertures through the side walls of the inserts were in line with the direction of movement of the particles in the stream, powder particles were held and fused to form firmly adhered patches both on the areas around the apertures on the external threaded surfaces and on the areas of the internal threaded surfaces opposite the apertures. The inserts with the patches formed thereon were stripped from the pins by the resilient fingers and were then cooled.

On cooling, the inserts were screwed into threaded holes in an aluminum block and thereafter bolts were inserted and thereafter removed from the internal threaded opening in the insert. The torques required for insertion and removal are listed on the following table:

| Insert Initial Installation Torque Maximum in./lbs. | Bolt Initial Installation Torque Maximum in./lbs. | Minimum Removal Torque in./lbs. | | | |
|---|---|---|---|---|---|
| | | 1st | 5th | 10th | 15th |
| 15.0 | 5.0 | 4.5 | 2.7 | 2.5 | 2.0 |
| 20.0 | 6.0 | 4.5 | 2.0 | 1.5 | 1.5 |
| 22.0 | 4.0 | 3.5 | 2.5 | 1.5 | 1.5 |
| 21.0 | 5.0 | 5.0 | 3.5 | 2.0 | 1.9 |

| | 22.0 | | 6.0 | 4.0 | 2.5 | 2.0 | 1.5 |

The torque values for Military Specification MIL-F 18240 are as follows: Maximum installation torque 9 inch. pounds and minimum torques for first, second, fifth, 10th and 15th removals are 1.5 inch. pounds in each case. It can be seen from the above table that the initial installation torque for the bolt into the insert is well below the maximum allowable initial installation torque and that the removal torque values equal or exceed the minimum permissible under that specification.

It will be observed that the torque required for installation of the insert in the aluminum block was from 3 to 5 times the torque required for removal of the bolt from the insert; and in no instance was the threaded insert removed in the course of removing the screw from the insert.

Having thus described my invention, what I claim as new and desire to secure as Letters Patent of the United States is:

1. A self-locking threaded sleeve insert having an external screw thread and internal screw thread, a body of normally hard, tough, resilient, heat-softenable resin adhered to the threaded surface of said external thread and a body of said resin adhered to the threaded surface of said internal thread, said body of resin on the surface of the internal thread being localized on portion of the surface of said thread with at least portions of the resin on the internal thread being diametrically opposite said body of resin on the external thread, said body of resin on the surface of the external screw thread having a locking area greater than the locking area of the body of resin on the surface of the internal screw thread to provide greater frictional locking action for holding said insert in place while a threaded element is being removed therefrom.

2. A self-locking threaded sleeve insert as defined in claim 1 in which said sleeve insert is formed with an aperture through a wall of said sleeve intermediate its ends and in which said resin body on the external screw thread covers portions of the threaded surface in an axial direction from the aperture as well as portions in a circumferential direction adjacent said aperture.

3. A self-locking threaded sleeve insert as defined in claim 2 in which said bodies of resin include a minor proportion of a tying agent to improve the union of the resin bodies with the surfaces of the screw threads.

4. A self-locking threaded sleeve insert as defined in claim 3 in which said tying agent is present to the extent of from about 5 percent to about 35 percent by weight of the combined weights of heat-softenable resin and tying agent in said resin bodies and in which the tying agent has a lower fusion temperature than the remainder of the resin in said bodies and when fluid has a superior ability to wet the threaded surfaces.

5. A self-locking threaded sleeve insert as defined in claim 2 in which a separate primer coat is disposed between the threaded surfaces and said bodies of resin.

6. A self-locking threaded sleeve insert as defined in claim 1 in which said resin body on the surface of the internal screw thread is distributed around a major portion of the surface of the internal screw thread in areas axially corresponding to said body of resin on the external thread.

7. A self-locking threaded sleeve insert as defined in claim 6 in which said bodies of resin include a minor proportion of a tying agent to improve the union of the resin body with the surfaces of the screw threads.

8. A self-locking threaded sleeve insert as defined in claim 7 in which said tying agent is present to the extent of from about 5 percent to about 35 percent by weight of the combined weights of heat-softenable resin and tying agent in said resin bodies and in which the tying agent has a lower fusion temperature than the remainder of the resin in said bodies and when fluid has a superior ability to wet the threaded surfaces.

* * * * *